UNITED STATES PATENT OFFICE.

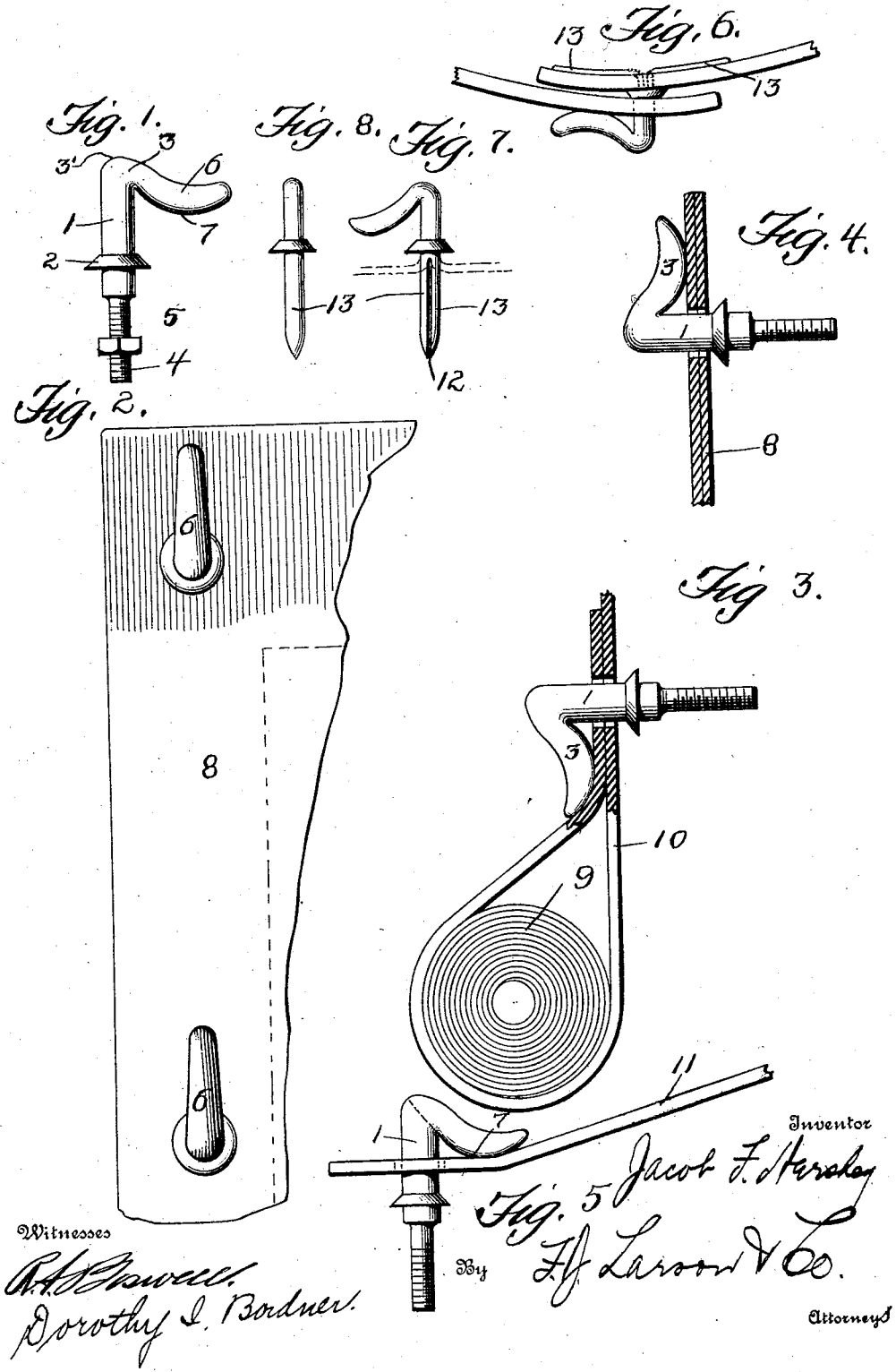

JACOB F. HERSHEY, OF OMAHA, NEBRASKA.

HOOK.

No. 866,030.   Specification of Letters Patent.   Patented Sept. 17, 1907.

Application filed April 5, 1907. Serial No. 366,532.

*To all whom it may concern:*

Be it known that I, JACOB F. HERSHEY, a citizen of the United States, residing at Omaha, in the county of Douglas and State of Nebraska, have invented certain new and useful Improvements in Hooks, of which the following is a full and complete specification, such as will enable others skilled in the art to which it appertains to make and use the same.

My invention relates to improvements in hooks, and more particularly relates to a hook designed for use in securing various types of flexible materials, or articles to a support.

The invention aims to provide a hook which enables ready and instant attachment of the material or the like and which effectually prevents accidental disengagement of the parts when properly related.

The possibilities of uses of my invention are various and extensive, and in the accompanying drawings I have merely depicted a few of the same which are to be considered rather in the light of example than enumeration.

In the drawings wherein like characters of reference denote similar parts throughout the several views, Figure 1, is a side elevation of a hook made in accordance with my invention, Fig. 2, is a side elevation showing my invention used in conjunction with a carriage or automobile curtain, Fig. 3, is an end elevation of a curtain roll-up strap partly in section secured to one of my improved hooks, Fig. 4, is a fragmentary vertical section of curtains secured to one of the improved hooks, Fig. 5, is a side elevation of a hook shown related to a check-rein as usually employed in harness, Fig. 6, one of the hooks modified to be especially adapted for use in positively securing the ends of horse-blankets, Fig. 7, is a side elevation of the hook shown in Fig. 6, prior to its attachment to the blanket, and Fig. 8, is an end elevation of Fig. 7.

As shown in Fig. 1, the hook is formed with a shank or stem 1, preferably circular in cross-section and of equal diameter throughout its working portion the latter being defined by a collar 2, and the head 3. The lower end of the stem is reduced in diameter as at 4, and formed with screw threads which may be used with a nut 5, to secure the hook to its support, or the nut may be omitted. Head 3, is integral with the stem or shank 1, and at its point of juncture is arcuate or rounded as at 3'; and has an integral nosing 6, which as depicted in Fig. 2, is preferably of slightly greater cross sectional size at its point of juncture with stem or shank 1, than at its free extremity. The nosing 6, is of concavo-convex form and of greater length than the effective working portion of the stem or shank. The nosing as illustrated is pointed downwardly at an acute angle to the stem or shank and has its free end turned upwardly and somewhat pointed so as freely and easily permit of insertion in the aperture provided therefor in the material or article to be attached to the hook. The effective working face 7, of the nosing is at point between its ends and is disposed considerably below the summit of the head 3, which necessarily requires that the attached material or the like be turned to be presented to the same angle to the shank that the nosing at its point of juncture with the shank bears to the latter, which manifestly completely eliminates any danger of accidental disengagement. By the stated disposition of the working face of the nosing to the head, the article or material will normally at all times be retained at a distance from the head. The greatest distance between the head and the point of juncture of the nosing with the shank, which in Fig. 5, is marked by a dotted line, is but slightly less than the diameter of the aperture formed for the reception of the hook in the material to be fastened, which while permitting the two parts to be attached and detached with slight pressure, still effectually prevents accidental removal which can only be accomplished at such times when the material is presented at the proper angle to the shank.

In Figs. 2 and 4, 8 designates a curtain secured in position by use of my improvement, it being observed that in this use the hook is pointed upwardly, since the manual disengagement is effected by exerting outward and upward pull on the curtain.

In Fig. 3, 9 denotes the curtain, and 10, the roll-up strap, the hook in this instance being pointed downwardly.

In Fig. 5, 11 denotes the check-rein leading to the bridle attached to the head of the horse. In this case the hook has a vertical disposition and inasmuch as the hook is borne by the gig-saddle of the harness the check-rein 11, will when properly disposed extend upwardly at an incline in which case the working face of the nosing by reason of its arcuate inclination will form a perfect seat for the check suited with exactness to the natural inclination of the same. The nosing in this case retains that portion of the check directly engaged with the shank at right angles to the latter, which requires that the rear of the check be turned upwardly at an angle to the shank marked by the dotted line of Fig. 5, in order to be removed.

Fig. 6, shows the improvement applied to a blanket, in which case the stem is bifurcated as at 12, to form bendable fingers 13, which are first passed through the aperture provided therefor and are then turned outwardly in opposite directions to engage the blanket as shown in Fig. 6.

Having thus fully described my invention what I claim is:—

1. A hook formed with a comparatively short shank, a head connected thereto and having an arcuate upper end, a concave-convex nosing projecting downwardly from said shank and at its juncture therewith forming an acute angle, a collar on the shank, and means beyond the collar to secure the shank in position.

2. A hook embodying a short shank, a head and a concave-convex nosing connected thereto by an arcuate portion, said nosing having its working face disposed considerably below said arcuate portion of the head, the under face of said nosing at its juncture with the shank forming an acute angle therewith, a collar on the shank, and means on the shank beyond the collar to secure the shank in position.

3. A hook embodying a comparatively short shank a rounded head and a downwardly extending nosing forming a continuation of said head, said nosing having a working face between its ends, and means on the inner end of the shank to secure the same in position.

4. A hook embodying a short shank, a head and a downwardly extending nosing, said nosing having a working face at points below the top of said head and having its free end turned upwardly, a shoulder on the shank, and means on the shank to secure the same in position.

5. A hook embodying a short shank, having at one end a curved head and a concave-convex nosing, the upper side of said nosing, the top of said head and the outer side of the shank merging into one another to form an even unbroken surface, and means at the other end of said shank to secure the same in position.

In testimony whereof I have signed my name to the specification in the presence of two subscribing witnesses.

JACOB F. HERSHEY.

Witnesses:
FREDK. J. LARSON,
MAX A. ROESSIG.